Aug. 6, 1929.  E. R. WITZEL  1,723,111
ALTERNATOR WITH INHERENT REGULATION
Filed June 27, 1928   3 Sheets-Sheet 3

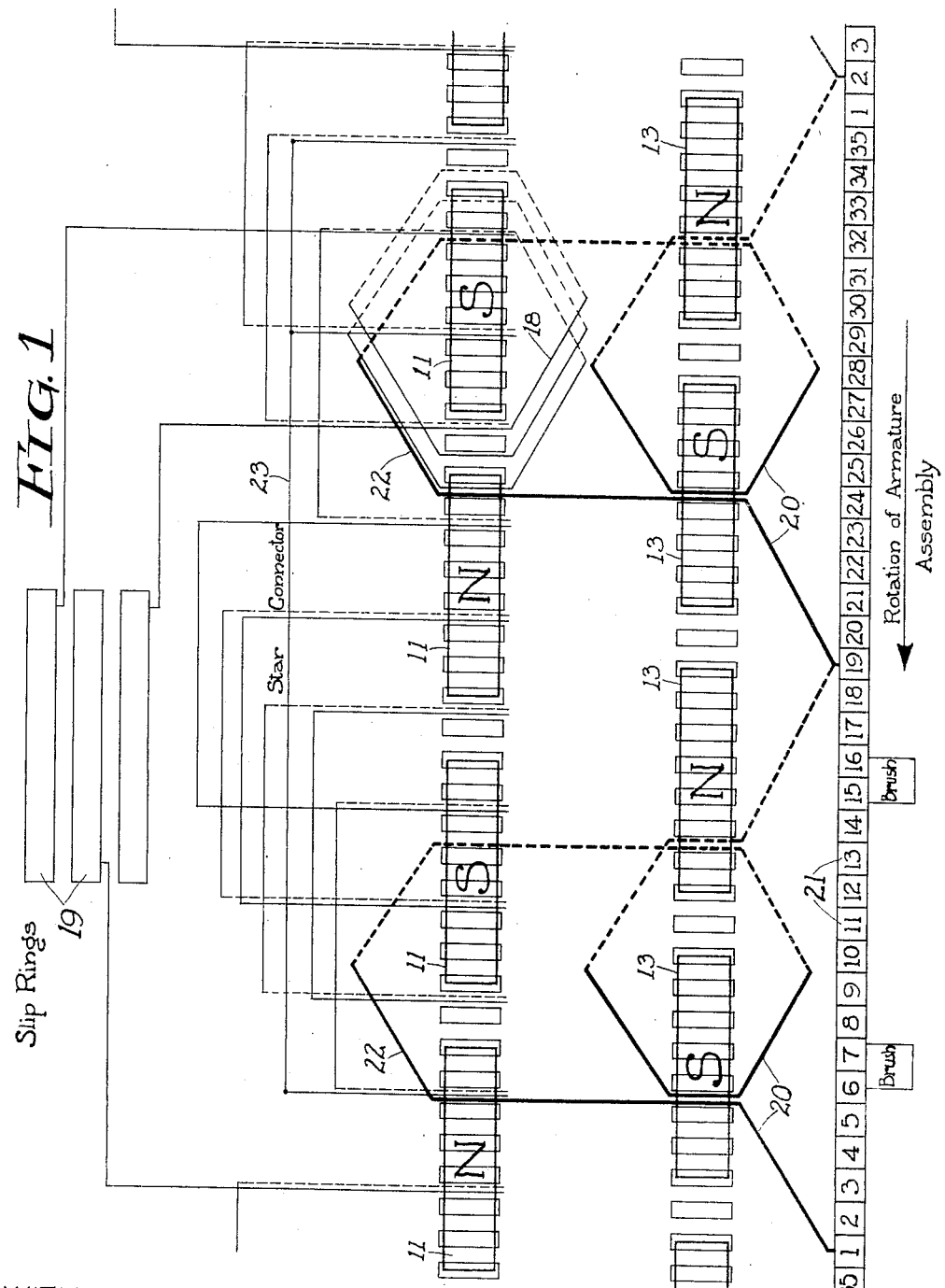

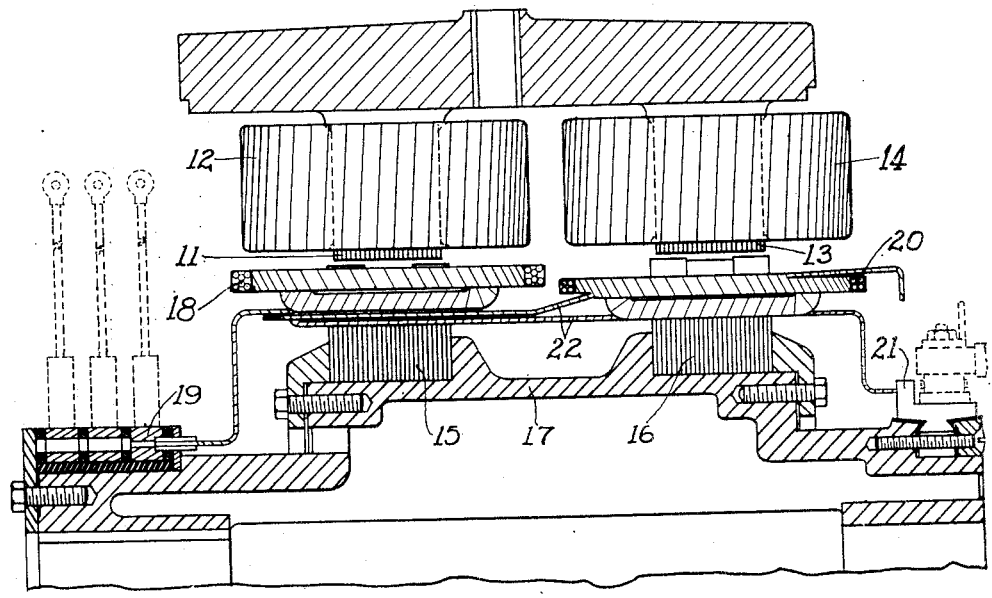
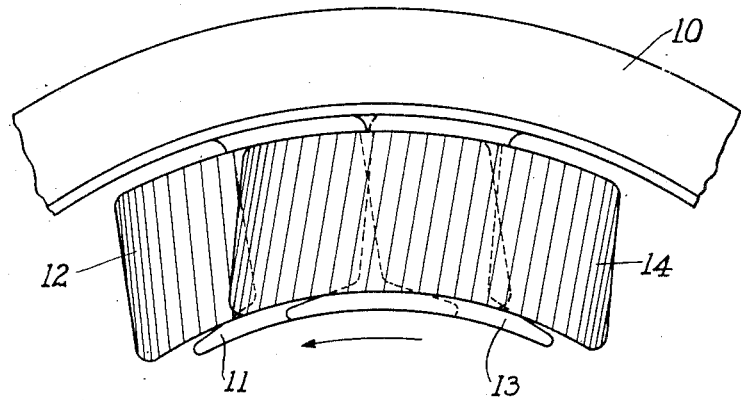

WITNESSES

INVENTOR
Earl R. Witzel
By R. S. Caldwell
ATTORNEY

Patented Aug. 6, 1929.

1,723,111

UNITED STATES PATENT OFFICE.

EARL R. WITZEL, OF KOHLER, WISCONSIN, ASSIGNOR TO KOHLER COMPANY, OF KOHLER, WISCONSIN, A CORPORATION OF WISCONSIN.

ALTERNATOR WITH INHERENT REGULATION.

Application filed June 27, 1928. Serial No. 288,629.

This invention relates to an alternator combined with an exciter of the rotating armature, salient-pole, type having inherent-voltage regulation due to angular displacement of the respective sets of field poles and an exciter armature winding extended into the range of the alternator field to receive a variable bucking influence therefrom. The voltage regulation is thus of the opposition or bucking type depending directly upon the magnetic fields in which the exciter armature coils revolve.

With the above and other objects in view the invention consists in the alternator with inherent regulation as herein claimed and all equivalents.

Referring to the accompanying drawings, in which like characters of reference indicate the same parts in different views, Fig. 1 is a circuit development diagram of a complete armature assembly showing in abbreviated form the armature windings in accordance with the present invention;

Fig. 2 is a transverse sectional view of an alternator constructed in accordance with this invention;

Fig. 3 is a side view of a portion thereof showing the angular displacement of the respective alternator and exciter field poles;

Figure 4:
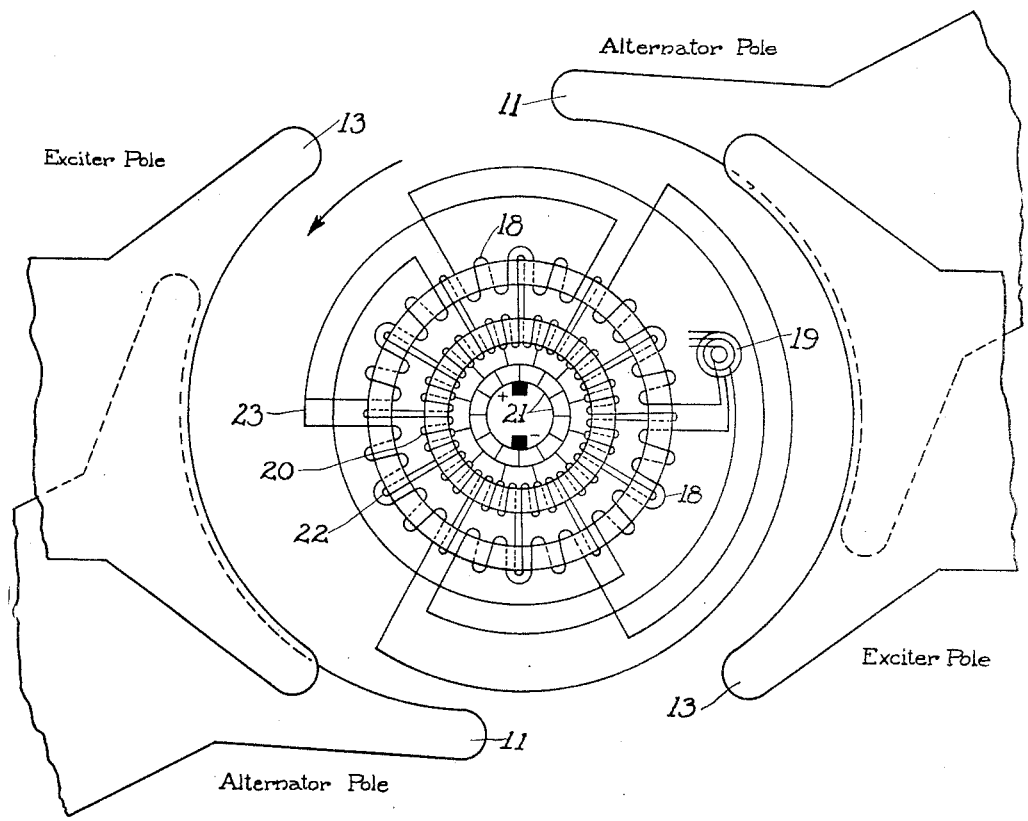
Fig. 4 is a diagram representation of the armature circuits and the field pole displacement.
Figure 5:
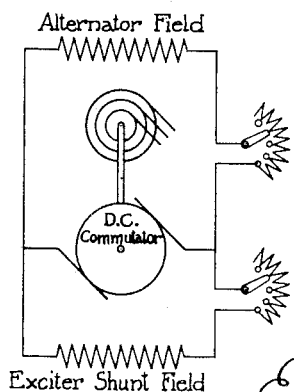
Fig. 5 is a diagram of field circuits.

In these drawings, 10 indicates a field casting having alternator field pole pieces 11 provided with field windings 12 and exciter field pole pieces 13 provided with field windings 14, the exciter pole pieces 13 being displaced ahead of the alternator pole pieces 11 approximately ten degrees.

In this unit the exciter and alternator are both of the revolving armature type, with both armatures on a common core.

The armature is of the double core type in which the stampings are assembled in two groups, group 15 for the alternator and group 16 for the exciter, separated by a spacer 17.

In the slots of the alternator armature core 15 are the usual alternator armature coils 18 which may be connected single or polyphase with any standard type of connection, series, star or delta, and terminate in slip rings 19 as in any revolving armature type alternator.

In the slots of the exciter armature core 16 are exciter armature coils 20, which are connected together in groups between the commutator segments 21. Each of these groups of exciter armature coils includes one or more extensions 22 looped through the slots of the alternator armature core.

Reference will be made to the development diagram of Fig. 1 showing one possible combination of a complete armature assembly which happens to be of four pole design with three phase alternator output and a wave-wound exciter armature.

The thirty-five commutator segments 21 are numbered from 1 to 35 consecutively and the exciter end of the armature is shown to be surrounded by four electromagnetic field poles 13 marked S N S N respectively, while the alternator end is shown to be surrounded by four electromagnetic field poles 11 marked N S N S respectively. The direction of rotation of the armature is indicated by the arrow and the approximate position of the exciter brushes is shown. One of the thirty-five exciter armature coils is shown as representative of the exciter armature winding, it being understood that the other coils are duplicates thereof, each surrounding the armature and returning to the commutator segment next to the starting point.

Starting from commutator bar 1 the coil passes through an armature slot under the S pole of the exciter field, then under an alternator N pole and across the back pitch of the armature under an alternator S pole and an exciter N pole. From here it turns to the left across the front pitch and back through the same slot as that first mentioned in tracing this circuit. After having passed under the exciter S pole a second time it now cuts directly across the back pitch of the exciter armature only, returning to the front of the armature by passing through a slot beneath the same exciter N pole previously mentioned and then to commutator bar 19. The second loop of this coil starts similarly from commutator bar 19 and takes a like course of travel, terminating in commutator bar 2. Thus the double coil from commutator bar 1 passes around the armature and terminates in the next commutator bar 2 and succeeding similar coils, not shown, may be traversed until commutator bar No. 1 is again reached, completing the exciter armature winding.

Each exciter armature coil is wound so that a certain percentage of the loops thereof lie only in the slots of the exciter armature, while the rest are common to both exciter and alternator slots. In this way the voltage of each armature coil is the vector sum of that generated by this special coil revolving simultaneously under two magnetic fields which are a few degrees from direct opposition. The exciter winding may be of any type of closed circuit windings connected to the commutator in the usual way, but with special coils as stated. While these armature coils are special as compared to standard practice, all exciter coils on any machine are alike, because each completed coil has a definite number of short turns and a definite number of long turns wound with a continuous conductor. These coils are all properly insulated from each other, from the frame of the machine, and from the alternator windings.

The exciter and alternator have an equal number of field poles, the angular relation of which is such that each exciter armature coil passes under the exciter field pole approximately forty electrical degrees before the extension of this same coil passes under the alternator field pole of the opposite polarity. In case the voltage of the exciter armature under the exciter poles is twice that of the voltage generated by the extensions under the alternator poles, this resultant might be expected to be one-half as much as if the alternator field poles were not magnetized, but due to the angular displacement of the two independent fields the actual exciter voltage is a vector addition after this angular displacement is properly accounted for, which means that the resultant is not a direct arithmetical subtraction but something greater in value.

Inasmuch as the extensions from each exciter coil are in the alternator slots, the actual opposing voltage generated by these extended conductors is due to the alternator magnetic field, which is a resultant of that produced by the field coils and any demagnetizing or cross-magnetizing action caused by any current in the alternator armature conductors.

The fundamental point of distinction for this winding is the fact that each complete exciter coil consists of one or more long turns and one or more short turns, depending on the relative total flux relationships of the two sets of field poles and the exciter voltage desired.

While this diagram shows a progressive simplex wave winding, this is only one possibility and others may be used.

The alternator armature winding 18, as here shown, is of an ordinary simple form in which three sets of coils are connected respectively with the three slip rings 19 and with the star connector 23 to constitute the ordinary three-phase star connection, though it may be single or polyphase and with any standard type of connection.

The next distinction is the relative polarities of the two sets of field magnet poles and their angular relation to each other. The illustrated coil of the exciter armature winding has a long turn and a short turn, of which the long or extended turn is at the instant simultaneously under two poles of opposite polarity. Therefore the instantaneous voltage induced in any one complete exciter coil is a resultant depending on the proportionate number of short and long turns and the relative direction of the magnetic flux cut by these turns at that instant. The final resultant voltage at the direct current brushes is then a summation of all of the resultants between brushes.

The field yoke is constructed with a restricted magnetic path between the two sets of field poles in order to minimize the stray longitudinal armature flux.

During the operation, with no current passing through the alternator armature windings, the voltage at the exciter brushes is the resultant induced voltage minus that voltage required to send the combined field excitation currents through this armature. In other words, this machine is self-excited and the terminal voltage (brush voltage in this case) must be slightly less than the induced or generated voltage because some difference of potential is required to overcome the internal armature and brush contact losses. During any condition of operation each extended exciter conductor is acted upon by two magnetic forces which are in opposition during a few degrees of the movement and are then cumulative for a shorter period. This variable resultant voltage combined with that generated by the regular short turn section of each exciter coil produces a final brush voltage which is somewhat complex. It is necessary that the alternator field be rather highly saturated and that the exciter field be of low saturation. The former is to prevent undue influence of the armature current in affecting the alternator field and the latter is to provide an effective means of increasing the exciter voltage with a minimum increase in exciter field current strength. This low saturation feature is standard practice with all exciters.

When a non-inductive load is connected to the alternator circuit the current in the alternator armature winding tends to increase the distortion of the magnetism passing into the armature from the field poles. This distortion is in the direction of rotation which shifts the magnetic flux tending to generate a bucking voltage in the exciter coils, so that there is less of the bucking action and more of the additive action, thereby raising the exciter voltage quite rapidly on account of the low magnetic saturation of the exciter field poles. On a non-inductive load this alternator field distortion with its resulting increase in exciter voltage is practically proportional to the alternator load. This is approximately equivalent to the usual compounding on direct current dynamos.

When the alternator load is below unity power factor, lagging, there is not only a distortion of the alternator field flux but also a direct demagnetizing action. Inasmuch as the alternator armature windings are in the same slots as the extensions from the exciter armature coils, the effect is to still further boost the exciter voltage, which, in turn, maintains nearly a constant voltage at the alternator terminals.

An inductive load operated by the alternator has a demagnetizing effect which indirectly adds to the exciter voltage. In this way the unit is compensated for any type of alternator load, whether it be inductive or noninductive or with a leading or lagging power factor. In actual practice, the exciter voltage (therefore the alternator exciting current) may increase as much as fifty per cent, depending on the amperes and power factor of the alternator load circuit. Within certain limits, the compounding action may be changed by the operator in the combined adjustments of the rheostats in either the exciter or alternator field circuits, or in both. In the construction of this machine the actual voltage of the exciter is entirely independent of the alternator voltage, although the percentage voltage variation will remain as above stated.

Using this alternator in an automatic gas-engine-driven generator set it is necessary that the alternator field circuit be opened during the cranking interval, thus preventing any tendency to oppose the rotation of the exciter armature within its own field. If the alternator field were energized during this period, the extended armature conductors would be bucking the cranking torque just as this action is manifested by the bucking voltage generation when used as a generator.

Although the two sets of field poles are secured to the same frame, the magnetic cross section is reduced to prevent too much interaction through the yoke between the fields. No special tests have been made to prove whether the two fields may or may not be separated magnetically, so at present a partial separation has been adopted in order that the frame may be a one-piece casting.

In this unit the alternating current is conducted directly to the slip rings and the external circuit, without passing through any regulating devices with their additional impedances. No doubt the interaction of the two sets of armature windings in the alternator slots introduce some mutual inductances but this is not found objectionable.

What I claim as new and desire to secure by Letters Patent is:

1. An inherently regulated alternating current generator comprising an armature member having alternator and exciter armature coils at the respective ends thereof, and alternator and exciter fields surrounding the armature member, said exciter armature coils having extensions passing through the armature slots of the alternator coils to receive an influence from the alternator fields.

2. An inherently regulated alternating current generator comprising an armature member having alternator and exciter armature coils at the respective ends thereof, and alternator and exciter fields surrounding the armature member, said exciter armature coils having extensions passing through the armature slots of the alternator coils to receive an influence from the alternator fields, the pole pieces of the alternator and exciter fields being angularly displaced with respect to each other.

In testimony whereof I affix my signature.

EARL R. WITZEL.